No. 878,702.
PATENTED FEB. 11, 1908.
G. E. WORTH.
HEMP BRAKE.
APPLICATION FILED JUNE 12, 1907.
2 SHEETS—SHEET 1.
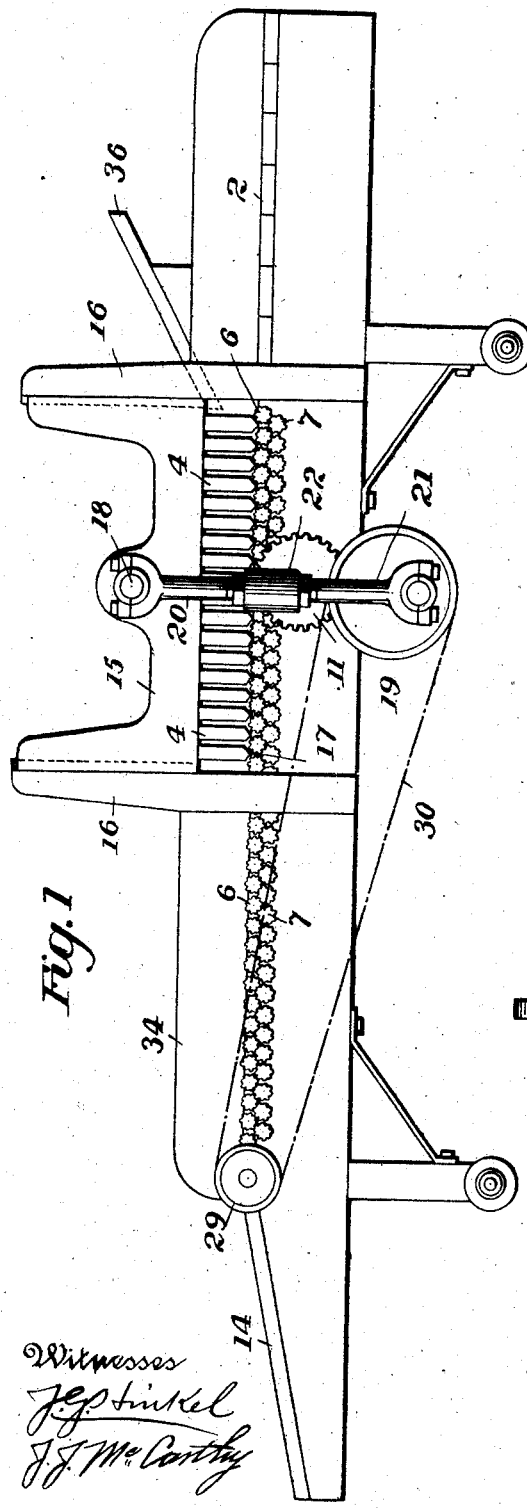
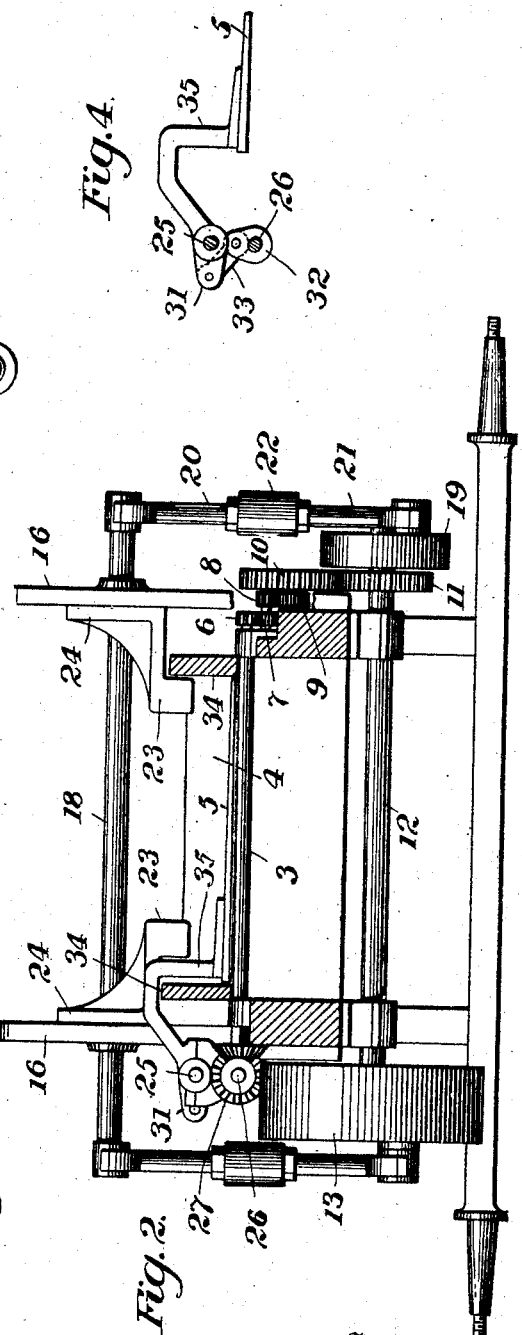

No. 878,702. PATENTED FEB. 11, 1908.
G. E. WORTH.
HEMP BRAKE.
APPLICATION FILED JUNE 12, 1907.
2 SHEETS—SHEET 2.
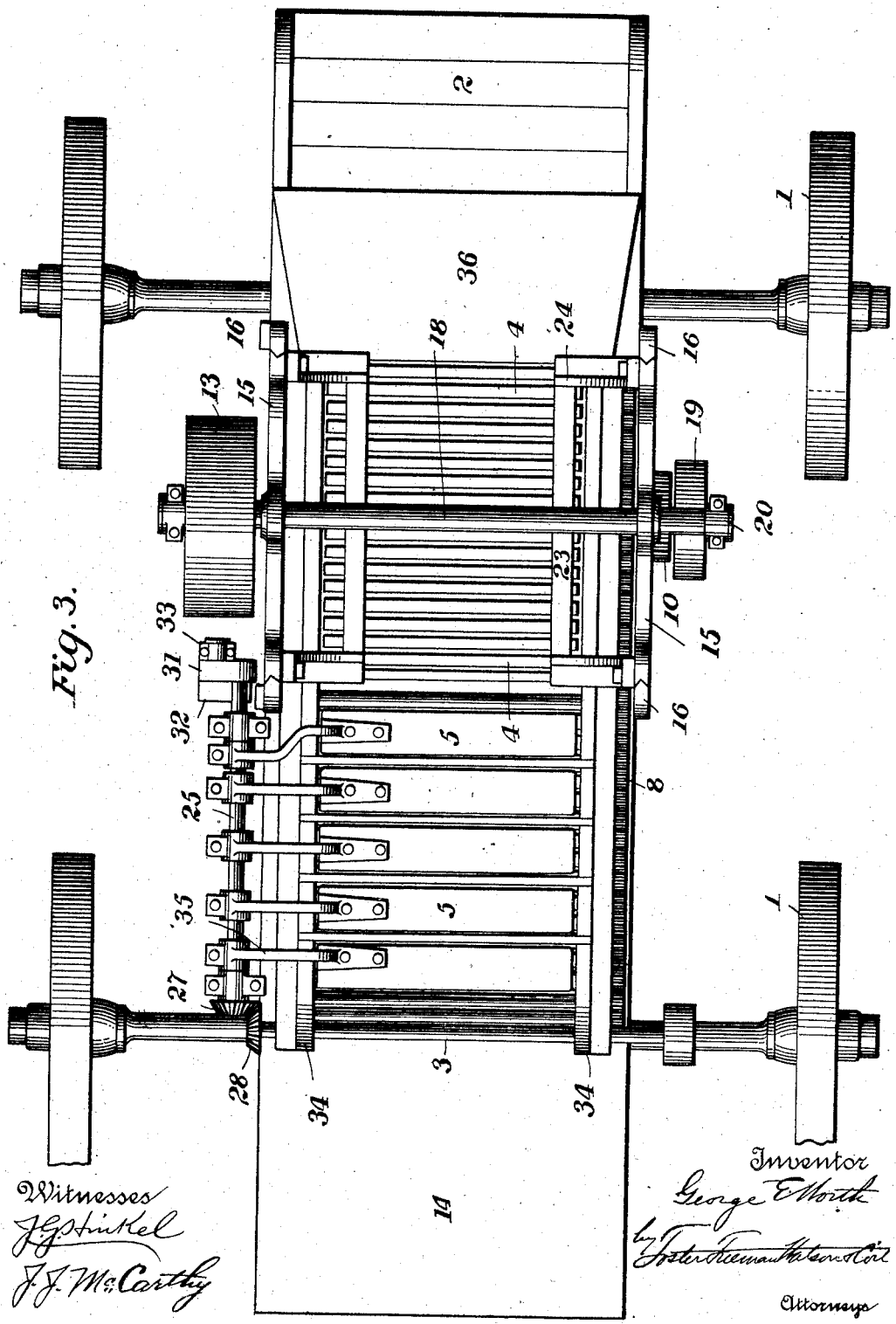

UNITED STATES PATENT OFFICE.

GEORGE EDWARD WORTH, OF BARNARD, NEW YORK.

HEMP-BRAKE.

No. 878,702.   Specification of Letters Patent.   Patented Feb. 11, 1908.

Application filed June 12, 1907. Serial No. 378,627.

*To all whom it may concern:*

Be it known that I, GEORGE EDWARD WORTH, a citizen of the United States, and resident of Barnard, Monroe county, State of New York, have invented certain new and useful Improvements in Hemp-Brakes, of which the following is a specification.

The present invention relates to improvements for treating fibrous plants, such as hemp, to separate the desired fiber from the woody and undesirable material in which it is embedded and will be described in the accompanying drawings, in which, Figure 1 is a side elevation, partly broken away of a machine constructed in accordance with the present invention; Fig. 2 is a front elevation partly in section; Fig. 3 is a plan; Fig. 4 is a detail.

Referring to the drawings, the machine is supported upon a vehicle body having carrying or supporting wheels 1 and comprises a feed table 2, a plurality of rollers 3, adapted to support the stalks or plants and feed the same through the machine, a series of breaker teeth 4 arranged to reciprocate to and from the rollers 3, and a series of beaters 5, together with means for properly operating said parts to break and remove the woodlike core or substance connecting the fibers of the plants passing through the machine from said fibers and prepare the latter for use.

The rollers 3 are arranged close together horizontally and extend across the machine forming a bed for the material to be treated, each roll being mounted in suitable bearings and provided at one end with a pinion 6. The roll pinions each engage or mesh with one of a series of pinions 7 journaled on one of the sides of the machine frame and one of said pinions 7 is carried by a shaft which is geared to a counter shaft through pinions 8, 9. A gear 10 on said counter shaft engages a pinion 11, on the main driving shaft 12 which is provided at one end with a driving pulley 13 to which power can be applied from any suitable source. By this means the rollers 3 will be similarly rotated as the driving shaft turns and operates to feed the material through the machine and beneath the breaker teeth 4 and beaters 5 onto the delivery table 14.

The breaker teeth are carried by a frame comprising two slides 15 mounted between guides 16, rising from the supporting frame. Each of said teeth is formed by a bar extending from one of said slides 15 to the other, parallel to the rollers 3, and having its lower edge reduced or beveled to provide a thin edge 17, said teeth being so arranged that the lower beveled end of each is adapted to pass between adjacent rollers 3 when said teeth are in their lowest position. The breaker teeth are reciprocated to and from the rollers 3 by links connecting a shaft 18 journaled in bearings on said slides 15, with a stud on one face of the pulley 13 and a similar stud on a pulley 19 mounted at the opposite end of the power shaft 12. Said links are adjustable in length to vary the extent of movement of the breaker teeth, each preferably comprising two members 20, 21, having their adjacent ends oppositely threaded and connected by a suitable coupling 22.

The breaker teeth 4 are connected with the slides 15 through brackets comprising bars 23, extending across the series of teeth, and arms 24 connecting said bars with the slides.

The series of beaters 5 are carried by a rock shaft 25 mounted in suitable bearings on one of the sides of the frame of the machine and extending transversely of the axes of the rolls 3, said rock shaft being connected with a shaft 26. The latter shaft is provided at one end with a bevel gear 27 with which meshes a corresponding gear 28 on the shaft of the last roller 3 of the series, said roller shaft having at its opposite end a pulley 29 which is connected by a belt 30 with the pulley 19 on the main driving shaft 12. The beater carrying shaft 25 may be connected with the shaft 26 by any suitable means whereby said shaft 25 will be rocked as the shaft 26 rotates. In the embodiment of the invention illustrated the beater shaft is provided at one end with a crank 31 which is connected with a similar crank 32 of the shaft 26 by a rod or link 33.

Each of the beaters consists of a flat plate-like bar of such length as to extend across the surface of the rollers 3 between the side frames or guides 34, and an angle arm 35 bolted to the body of the beater and connected with the rock shaft 25. The plates constituting the bodies of the beaters are of such width that each extends over two of the rolls 3 and the space between said rolls and is so arranged and mounted that each is moved bodily vertically to and from the rolls and is parallel therewith when in its lowest position. This construction provides an extended beater surface with a minimum number of parts.

In its passage to and through the machine the material is guided by the side flanges or guard plates 34, above referred to, and a hood or shield 36 is provided at the inner end of the feed table 2.

The manner of operating the mechanism hereinbefore described will be readily understood. The stalks of fibrous material are introduced beneath the hood 36 and drawn beneath the breaker teeth 4 by the action of the feed rolls 3 and said breaker teeth are reciprocated to and from the rollers to break or crush the undesirable material connecting the fibers which it is desired to separate. By the action of said rolls 3 the material is carried beyond the breaker teeth and beneath the flat beaters 5 which operate to free the fibers from the material broken by the teeth 4 so that the fibers discharged on the delivery table 14 are separated from the core or wood of the stalk. The rollers 3 are so spaced that the fine particles of undesirable material separated from the fiber by the action of the teeth 4 and beaters 5 may pass through and fall beneath the machine so that the fiber delivered onto the table 14 will not only be properly separated but will also be cleaned. By mounting the machine in the manner described it may be readily moved from place to place.

Having described my invention what I claim and desire to secure by Letters-Patent is, 1. In a machine for treating fibrous plants, the combination of a series of feed rollers, arranged horizontally and close together, means for rotating said rollers, a series of breaker teeth arranged above and extending parallel to a portion of said rollers, the lower edge of each of said teeth being adapted to extend into the space between the upper surfaces of adjacent rollers when in its lowest position, means for reciprocating said teeth to and from the rollers, and a plurality of beaters arranged to operate upon the material after it is moved from beneath said teeth by the feed rollers.

2. In a machine for treating fibrous plants, the combination of a series of horizontally arranged feed rollers, means for rotating said rollers, a breaker comprising two slides mounted upon guides arranged on opposite sides of the series of rollers, and a plurality of cross-bars connecting said slides and arranged to extend into the spaces separating the rollers beneath them, means for reciprocating the breaker to and from the rollers, and a series of beaters movable to and from the rollers beyond the breaker.

3. In a machine for treating fibrous plants, the combination of a series of horizontally arranged feed rollers, means for rotating said rollers, a breaker movable toward and from the rollers adjacent one end of the series, and a plurality of beaters adapted to be moved toward and from the rollers beyond the breaker, each of said beaters including a plate or bar adapted to extend over two adjacent rollers and the intermediate space.

4. In a machine for treating fibrous plants, the combination of a series of horizontally arranged feed rollers, means for rotating said rollers, a breaker, means for conveying the material away from between said feed rollers and breaker, a beater comprising a flat plate or bar extending throughout the width of said conveying means, and means for automatically moving said plate toward and from the conveyer.

5. In a machine for treating fibrous plants, the combination of a series of horizontally arranged feed rollers, means for rotating said rollers, a breaker arranged above and movable to and from said rollers, a conveyer for removing material from between the breaker and its coöperating rollers, a rock shaft mounted at one side of said conveyer, a plurality of beaters connected with said shaft and extending throughout the width of the conveyer, and means for rocking said shaft connected with the devices for reciprocating the breaker.

6. In a machine for treating fibrous plants, the combination of a series of horizontally arranged feed rollers, a pinion at one end of each of said rollers, a series of supplemental pinions each meshing with one of the feed roller pinions, a driving shaft, gearing connecting said driving shaft with one of said supplemental pinions, a pair of slides arranged at opposite ends of said feed rollers, a plurality of breaker teeth connected to said slides and each adapted to enter the space between two of said rollers when in its lowest position, rods connecting said slides with the driving shaft, whereby said breaker teeth will be reciprocated as the feed rollers are turned, a plurality of beaters arranged beyond said breaker teeth, and each extending parallel to the feed rollers beneath it, and means for moving the beaters to and from said rollers, said means being connected with the aforesaid driving shaft.

In testimony whereof I affix my signature in presence of two witnesses.

GEORGE EDWARD WORTH.

Witnesses:
    HARRY B. REED,
    RICHARD L. SAUNDERS.